United States Patent [19]
Pouch et al.

[11] 3,829,957
[45] Aug. 20, 1974

[54] METHOD OF ASSEMBLING A SELF-FASTENING NUT AND A PANEL

[75] Inventors: Thomas M. Pouch, Farmington; Harold A. Ladouceur, Livonia, both of Mich.

[73] Assignee: Multifastener Corporation, Detroit, Mich.

[22] Filed: Oct. 30, 1972

[21] Appl. No.: 302,312

[52] U.S. Cl.................. 29/445, 29/509, 29/521, 29/522, 151/41.73
[51] Int. Cl............................................. B23p 9/00
[58] Field of Search ............ 29/432, 509, 445, 521, 29/522; 151/41.73

[56] References Cited
UNITED STATES PATENTS

| | | | |
|---|---|---|---|
| 1,471,952 | 10/1923 | Ford | 29/445 |
| 2,018,683 | 10/1935 | Meyer et al. | 29/432 |
| 2,975,928 | 3/1961 | Roovers | 29/521 UX |
| 3,229,363 | 1/1966 | Bien | 29/432 |
| 3,234,987 | 2/1966 | Hentzi | 29/432 |
| 3,282,315 | 11/1966 | Zahodiakin | 29/432 X |
| 3,315,345 | 4/1967 | Double et al. | 29/521 X |
| 3,337,946 | 8/1967 | Anderson et al. | 151/41.73 X |
| 3,469,613 | 9/1969 | Steward | 29/522 X |
| 3,724,520 | 4/1973 | Ladouceur | 29/432 X |

Primary Examiner—Charlie T. Moon

[57] ABSTRACT

The disclosed self-fastening nut includes a rectangular flat end face which is received against the panel, a smooth cylindrical central bore perpendicular to the end face and a pair of linear grooves equally spaced from the bore and dividing the end face into a central pilot and a pair of flanges. The nut is assembled on a cylindrical punch which extends through the nut bore, beyond the end face and punches a hole in the panel in registry with the nut bore. The panel is supported on a die having two upstanding clinching lips which deform the panel into the nut grooves and the panel is simultaneously urged against the nut to lie flat against the end face.

The panel opening and nut bore are then tapped by a self-tapping bolt, or the like, which is inserted through the panel opening and forms a continuous female thread in the panel metal edge defining the panel opening and the cylindrical wall of the nut bore. In a disclosed embodiment, the die also includes a pair of spanking lips, perpendicular to the clinching lips, which deform the panel on opposite sides of the nut to provide increased torque resistance during threading and increased resistance to shear or sliding.

12 Claims, 9 Drawing Figures

PATENTED AUG 20 1974 3,829,957

METHOD OF ASSEMBLING A SELF-FASTENING NUT AND A PANEL

FIELD OF THE INVENTION

The disclosed invention relates to improved self-clinching fasteners which are secured to a panel in a press operation. The disclosed nut is secured to the panel prior to threading and the panel opening is threaded at the same time as the nut.

The relevant prior art may be divided into two general classes: self-piercing fasteners, wherein the pilot portion of the nut pierces the panel and the nut is simultaneously secured to the panel in one stroke of the press; and, clinch nuts, wherein the panel is first punched in a separate operation and the nut is then secured in the panel opening by clinching. In each case, the nut bore is threaded, prior to securement to the panel, to receive a male fastener.

The self-piercing fasteners may be further divided into two classes: the T-shaped pierce nuts which include a central pilot portion which pierces the panel and a pair of opposed flanges which are received against the panel, as shown by U.S. Pat. No. 3,152,628; and, the "HI-STRESS" pierce nut, which includes a plurality of grooves adjacent the pilot portion, wherein the panel is pierced and the pierced edge is deformed into the panel grooves, as shown by U.S. Pat. No. 3,648,747. The latter type is more pertinent to the disclosed invention. In the "HI-STRESS" pierce nut, a rectangular pilot extends above the plane of the flanges to pierce a rectangular slug from the panel and the pierced panel edges are deformed into a plurality of grooves in the nut. The "HI-STRESS" nut is preferably threaded prior to assembly in the panel, such that the nut is not subjected to the axial force of the power tool.

In the self-clinching nut of this invention, the pilot face is coplanar with or just below the plane of the flanges, providing a substantially flat end face which receives and supports the panel. The nut bore is preferably a smooth cylindrical aperture, generally perpendicular to the end face and the nut includes a groove in the end face on opposite sides of the bore.

In the preferred method of this invention, the end face of the nut is supported adjacent the panel, in parallel relation, on a cylindrical punch. The punch may extend through the nut bore to punch a circular hole in the panel having an internal diameter equal to the internal diameter of the nut bore. The punch forces the nut against the panel, with the hole in registry with the bore, and the panel flat against the pilot face, adjacent the bore. Portions of the panel are simultaneously deformed into the nut groove to retain the nut on the panel as described below. The panel opening is punched and the nut is secured to the panel in one stroke of the press. The nut and panel may be now threaded, without forcing the nut off the panel, because the panel is threaded first.

In the disclosed method, the panel is interposed between a die and the nut end face, the die being perpendicular to the axis of the punch. The die includes an upstanding clinching lip, registering with the nut groove, which forces a portion of the panel into the groove to retain the nut on the panel. A second pair of lips, in the disclosed embodiment of the die, deform the panel, on opposite sides of the nut, to aid in the shear retention of the nut on the panel and to prevent rotation during threading. The nut grooves preferably provide a restricted panel receiving opening to securely lock the nut on the panel.

The disclosed embodiment of the nut includes a generally rectangular panel contacting end face, a pair of grooves on opposite sides of the face and dividing the end face of the nut into a central pilot portion and a pair of flange portions on opposite sides of the pilot portion. The end face of the nut is supported against the panel and, during installation, the panel is deformed into the linear grooves and against the sides of the nut to securely retain the nut on the panel.

Other improvements and meritorious features of the disclosed self-fastening nut, assembly and method of this invention will appear from the following description of the preferred embodiment, the claims and the appended drawings.

DESCRIPTION OF THE PREFERRED EMBODIMENT

Figure 1:
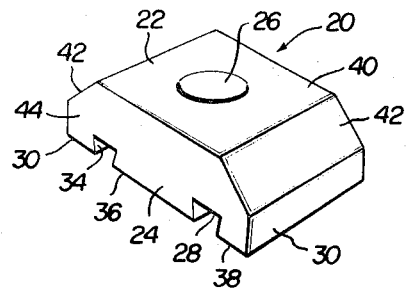
FIG. 1 is a perspective side elevation of one embodiment of the self-fastening nut of this invention, showing the bottom of the nut.
Figure 2:
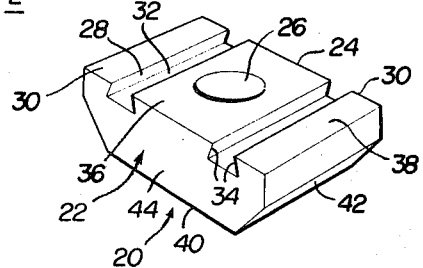
FIG. 2 is a perspective top elevation of the nut shown in FIG. 1.

The self-fastening clinch nut 20 shown in FIGS. 1 and 2 includes a body portion 22 preferably formed of a relatively rigid metal, such as steel, to support the panel and securely retain the nut on the panel. The body portion includes a central pilot 24 having a smooth cylindrical bore 26 extending through the pilot portion. A pair of linear grooves 28 are defined in the end face of the nut on opposite sides of the pilot portion which divide the end face of the nut into the central pilot portion 24 and a pair of flanges 30.

In the disclosed embodiment, the grooves 28 each include a bottom wall 32, which is generally parallel to the end face of the nut, and a pair of inclined side walls 34 defining a restricted opening or re-entrant groove for receipt of the panel. The width and depth of the groove depends upon the particular application of the nut, including the panel thickness. An angle of approximately ten degrees has been found suitable for the angle of inclination of the grooves in most applications.

The flat end face 36 of the pilot is preferably coplanar with the end faces 38 of the flanges, or slightly below, for flatwise contact with the panel, without piercing the panel. Where the pilot end face is "below" the plane of the flanges, the panel is initially supported on the flanges and the pilot end face is slightly spaced from the panel. The configuration of the opposite end of the nut is not critical to the disclosed invention, however in the disclosed embodiment, the end face 40 of the nut is parallel to the opposite end face 36 of the pilot portion and the walls 42 are inclined, as shown. The sides 44 of the nut are preferably perpendicular to the end face 36 of the pilot.

The nut shown in FIGS. 1 and 2 may be formed by any suitable method, including the method disclosed in U.S. Pat. No. 3,299,500, which is assigned to the assignee of the instant application. In the method disclosed in the above referenced patent, the cross-sectional area of the nut is rolled from a continuous strip of stock and the individual nuts are cut from the strip.

Figure 3:
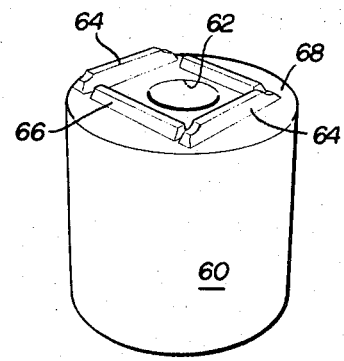
FIG. 3 is a perspective top elevation of a die suitable for securing the nut shown in FIGS. 1 and 2 to a panel and utilized in the method of this invention.
Figure 4:
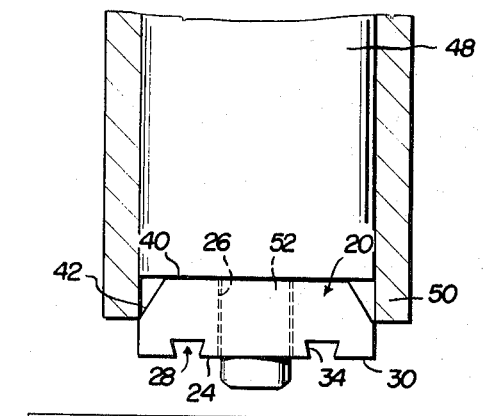
FIGS. 4 and 5 are side elevations of the assembly of the nut shown in FIGS. 1 and 2 to a panel.
Figure 5:
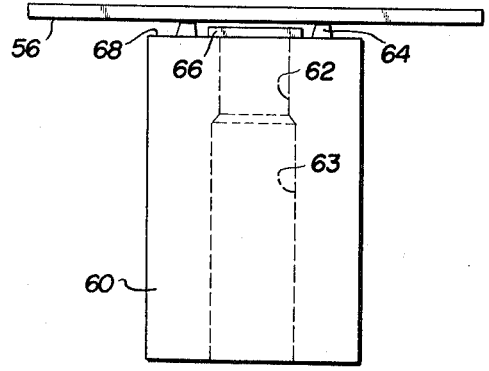
Figure 5:
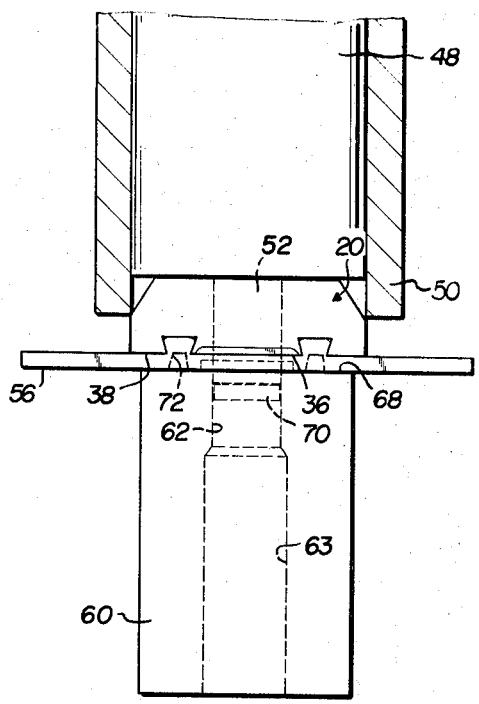

The method of forming the panel assembly is shown in FIGS. 3 to 5, wherein the nut 20 is supported on a punch member 48 telescopically received within a sleeve 50 and configured to receive and support the nut for securement to the panel. The punch member includes a cylindrical punch 52 which extends through the aperture 26 in the nut, beyond the pilot portion 24. The punch 52 may be a separate, spring loaded punch which is retracted to receive the nut 20 laterally or may be integral with the punch member 48.

The panel 56 in the disclosed method is supported in the press on a die member 60. The details of the press are not shown, except for the punch 48 and the die 60. It will be understood, however, that the punch 48 may be moved toward the die 60 to engage the panel or the panel may be moved toward the punch. The force required to secure the nut to the panel will depend upon the material of the panel 56, the thickness of the panel and the dimensions of the nut 20.

The disclosed die 60 includes a first cylindrical aperture 62 adapted to receive the cylindrical punch 52 and a second aperture 63 adapted to receive the panel slug, as described below. The die member includes a pair of upstanding clinching lips 64, as best shown in FIG. 3, which are spaced from the aperture 62 and aligned with the grooves 28 in the nut, as shown in FIGS. 4 and 5. The disclosed embodiment of the die 60 also includes a pair of spanking lips 66, generally perpendicular to the clinching lips 64, but spaced from the clinching lips, as shown in FIG. 3. The height of the spanking lips 66 is preferably less than the height of the clinching lips, so that the panel is supported on the clinching lips as shown in FIGS. 4 and 5.

With the nut 20 and the panel 56 supported in the position shown in FIG. 4, the nut is forced into contact with the panel, as shown in FIG. 5. As the punch 48 travels downwardly, the cylindrical punch 52 first pierces a slug 70 from the panel, as shown in phantom in FIG. 5. Almost simultaneously, the panel is forced flat against the end faces 36 and 38 of the pilot and flange portions, respectively, and the lips 64 and 66 of the die 60 deform the panel, in one stroke of the press.

Figure 6:
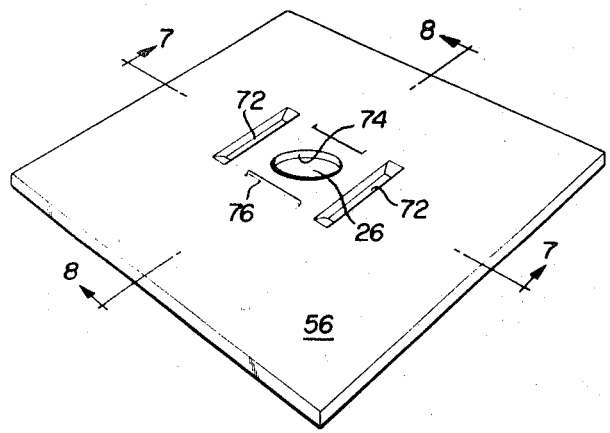
FIG. 6 is a bottom perspective view of the panel assembly formed in FIGS. 4 and 5.
Figure 7:
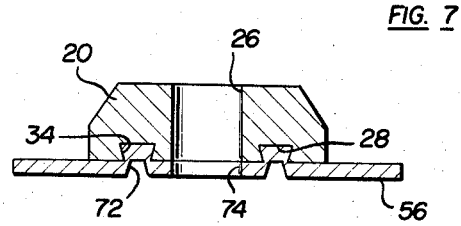
FIG. 7 is a side cross-sectional view of the nut and panel assembly shown in FIG. 6, in the direction of view arrow 7—7.
Figure 8:
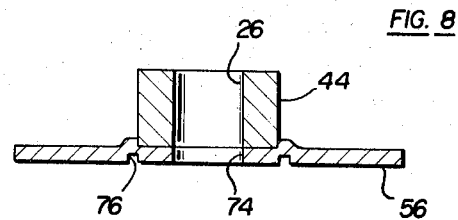
FIG. 8 is a side cross-sectional view of the nut and panel assembly shown in FIG. 6, in the direction of view arrows 8—8.

The contacting clinching lips 64 first force the panel into the nut grooves 28 and deform the panel portions into the grooves to securely retain the nut on the panel, as shown at 72 in FIGS. 6 and 7. The spanking lips 66 simultaneously deform portions 76 of the panel against the side walls 44 of the nut, as shown in FIGS. 6 and 8, preventing rotation of the nut and aiding in the retention of the nut on the panel. The diameter of the punch 52 is substantially equal to the diameter of the nut bore 26, so that the inside diameter of the hole 74 punched from the panel is substantially identical to the inside diameter of the bore 26, as shown in FIGS. 7 and 8. It will also be noted that the cross-section of the clinching lips 64 is generally rectangular or trapazoidal. This configuration has been found particularly satisfactory for locking the panel in the groove openings. The width of the clinching lips 64 must be less than the restricted opening of the groove 28 to prevent piercing of the panel at the groove opening. The width of the spanking lips is not as critical.

The method of forming the assembly shown in FIGS. 6 to 8 then includes, assembling the nut 20 on a cylindrical punch 52 which extends through the nut bore 26, beyond the pilot 24. The panel 56 is supported on a die 60 having a plurality of clinching lips 64 aligned with the grooves 28 in the nut. The method steps then include, punching a circular hole 74 having an internal diameter preferably equal to the internal diameter of the nut bore, forcing the nut 20 against the panel 56, with the hole in registry with the nut bore and the panel flat against the pilot face 36, and simultaneously deforming portions 72 of the panel into the nut groove 28, to securely retain the nut on the panel. In the disclosed embodiment of the method, the die includes additional spanking lips 66 which deform further portions 76 of the panel against the sides 44 of the nut, as shown in FIG. 8. All of the above steps are accomplished in sequence and substantially simultaneously, in one stroke of the press.

The portion of the panel overlying the pilot end face 36, increases the bearing surface of the panel over the bearing surface available in the self-fastening nuts shown by the prior art. The pilot portion extends beyond the flange portions 30 in the HI-STRESS nut shown in the above patent and pierces a rectangular slug from the panel. Further, the nut may be threaded in place, as described below, because the panel edge defining the aperture 74 will be threaded prior to threading of the nut, as shown in FIGS. 7 and 8. The forces associated with threading a nut in place, include both axial force against the nut and rotational or torque forces. Further, the starting torque in threading a fastener is generally greater than the threading torque. Where the panel is threaded prior to the nut, however, the panel receives the axial force and the starting torque, and the nut will not be pushed from the panel during threading. This is an important advantage of the disclosed nut, assembly and method of this invention.

Figure 9:
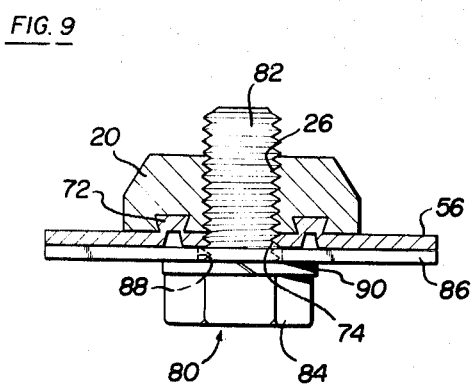
FIG. 9 is a side, partial cross-sectional view of a panel assembly, including a self-tapping bolt.

The assembly is completed, as shown in FIG. 9, by threading a self-tapping male threaded member in the panel opening, as shown in FIG. 9. A nut is generally secured to a panel to retain a structural member to the panel, as shown. In the embodiment shown in FIG. 9, a self-tapping bolt 80 is received within the panel opening 74 to form a continuous female thread in the pierced edge of the panel opening and the cylindrical bore 26. The bolt includes a self-tapping thread 82 on the shank and a head portion 84. In the disclosed embodiment, a panel 86 having an enlarged opening 88 is secured to the panel 56 by the self-tapping bolt 80. A washer 90 may also be provided, which bridges the opening 88 in the second panel.

The pitch diameter of the threaded shank 82 of the bolt is preferably equal to the internal diameter of the panel aperture 74, and the nut bore 26, to form a continuous female thread in the panel aperture and the nut bore, as the bolt is threaded into the panel aperture. The threading of the panel aperture may be less than a full turn of the thread, but provides a substantial advantage as described above. The nut will not be forced from the panel, as the bolt is threaded into the panel opening, which starts the thread in the nut bore. The nut is securely locked on the panel by the panel portions 72 and is prevented from rotating by panel portions 76.

The material of the panel 56 will also depend upon the particular application of the panel assembly, however in most applications the panel is sheet steel, such as an automotive body panel or structural member. In such applications, the panel has a predetermined thickness which will determine the size and configuration of the grooves 28 in the nut body. In the disclosed application, the depth and width of the groove 28 is a function of the thickeness of the panel and the requirements of tool life. The panel metal in the grooves is not severed from the panel, but is merely displaced into the nut grooves to be interlocked therein by the re-entrant configuration of the grooves. The disclosed method sequence of punching the panel, forcing the panel against the nut and deforming the panel into the groove openings is only one of several sequences which may be utilized to form the panel assembly shown in FIGS. 6 to 9. For example, the panel may be supported on the nut, in which case the nut is first secured to the panel and the hole is punched later. It is the combination of steps in one stroke of the press which are important to the method of this invention.

We claim:

1. A method of securing a nut to a panel in overlying relation, said nut having a flat pilot face contacting one face of the panel, a smooth cylindrical bore through said nut generally perpendicular to said pilot face and a groove defined in said pilot face on opposite sides of said bore, including the steps of, (a) punching a circular hole in said panel having an internal diameter equal to the internal diameter of said nut bore at said pilot face, (b) forcing the nut against the panel with said hole in registry with said bore and the panel flat against said pilot face adjacent said hole, and (c) deforming a portion of the panel into interlocked relation with said groove to retain the nut on the panel, and threading a self-tapping male threaded member into said panel hole and continuing to thread said nut bore to provide a continuous female thread in said panel hole and nut bore.

2. The method defined in claim 1, wherein said nut surrounds a cylindrical punch extending through said nut bore to project beyond said pilot face, including the step of punching said panel hole immediately prior to contact of the nut against the panel.

3. The method defined in claim 1, wherein the panel is interposed between the nut and a die having a clinching projection extending towards said panel, and wherein the step of deforming said panel portions into said nut groove is carried out by engaging said panel with said die as said nut is retained against said panel.

4. The method defined in claim 3, wherein said nut is generally rectangular and includes two linear grooves on opposite sides of said pilot portion and said die includes two clinching lips registerable with said grooves, respectively, including the step of deforming two continuous linear portions of said panel into said nut grooves.

5. The method defined in claim 4, including the step of deforming a second pair of spaced linear panel portions, generally perpendicular to said two continuous linear portions, but spaced therefrom, on either side of said nut and engaging said nut sides.

6. The method defined in claim 1, wherein said groove has a restricted opening adjacent said pilot face, including the step of forcing said panel portions into said restricted opening and deforming said panel portions within said groove to lock the nut on the panel.

7. In a method of securing a nut on a panel, said nut having a bore, a planar end face generally perpendicular to the axis of said bore and surrounding said bore, and at least two grooves defined in said end face, said grooves being spaced from said bore and on opposite sides of said bore, the steps of:
   a. telescopically assembling said nut on a punch, said punch extending through said nut bore to terminate beyond said end face,
   b. interposing said panel between said punch and a die, the panel being spaced from said nut end face and generally perpendicular to the axis of said punch, said die having an opening registering with said punch and upstanding lips registering with said nut grooves, respectively, and
   c. in a single uninterrupted stroke, relatively moving said punch and said die into engagement with opposite sides of said panel to (1) punch a circular hole in said panel with said cylindrical punch, (2) to urge said panel flat against said end face of the nut with said hole in registry with said nut bore and (3) to deform those portions of said panel between said nut and said die lips into interlocked relation with said nut grooves, thereby retaining said nut on said panel.

8. The method defined in claim 7, wherein said nut bore is a smooth cylindrical aperture and the external diameter of said punch is substantially equal to the internal diameter of said nut aperture, including the additional step of threading a self-tapping bolt into said panel hole and continuing to thread said bolt into said nut aperture, forming a continuous female thread in said panel hole and said nut aperture.

9. The method defined in claim 7, including the additional step of tapping the internal edge defining said panel hole and continuing to tap said nut bore in a continuous female thread.

10. The method defined in claim 7, wherein said nut includes generally flat side walls, including the step of deforming linear portions of the panel on opposite sides of said nut, against said side walls to limit rotation of the nut on the panel.

11. The method defined in claim 10, wherein said nut is generally rectangular and includes two linear grooves generally perpendicular to said side walls, substantially equally spaced from said bore, defining a central pilot portion and a pair of flange portions on opposite sides of said pilot portion, including the step of urging the panel against the planar end faces of said pilot and flange portions and simultaneously deforming said panel portions into said grooves and against said opposed side walls of the nut.

12. The method defined in claim 7, wherein said groove has a restricted opening defined by side walls inclined toward said end face, including the step of forcing said panel portions into said restricted groove opening and simultaneously deforming said panel portions within the groove to securely lock the nut on the panel.

* * * * *